Figure 1:
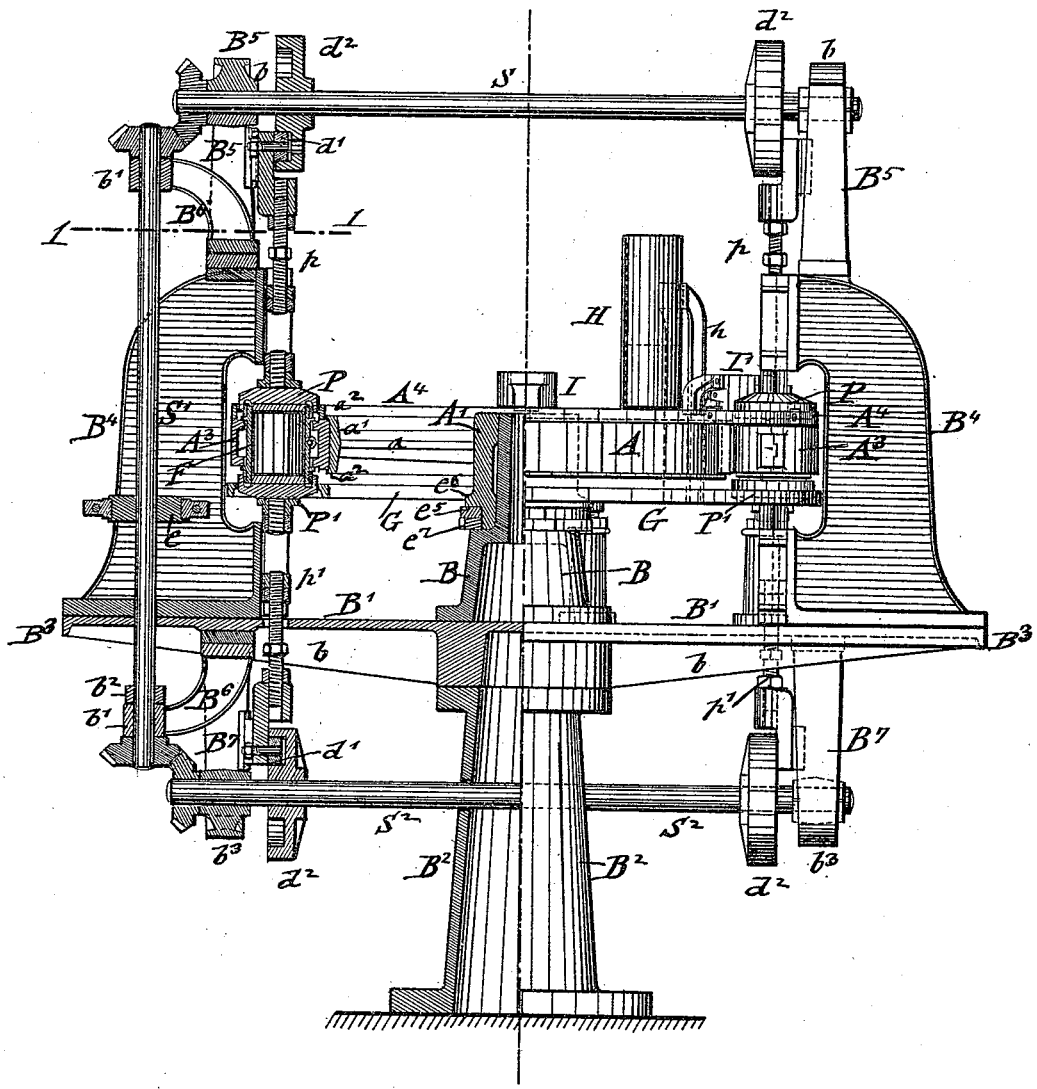

(No Model.) 6 Sheets—Sheet 1.

R. STEEGMÜLLER.
CAN HEADING MACHINE.

No. 440,379. Patented Nov. 11, 1890.

WITNESSES:

INVENTOR
Richard Steegmüller
BY
ATTORNEYS.

(No Model.) 6 Sheets—Sheet 2.

R. STEEGMÜLLER.
CAN HEADING MACHINE.

No. 440,379. Patented Nov. 11, 1890.

WITNESSES:

INVENTOR
Richard Steegmüller
BY
ATTORNEYS.

(No Model.) 6 Sheets—Sheet 3.
R. STEEGMÜLLER.
CAN HEADING MACHINE.
No. 440,379. Patented Nov. 11, 1890.
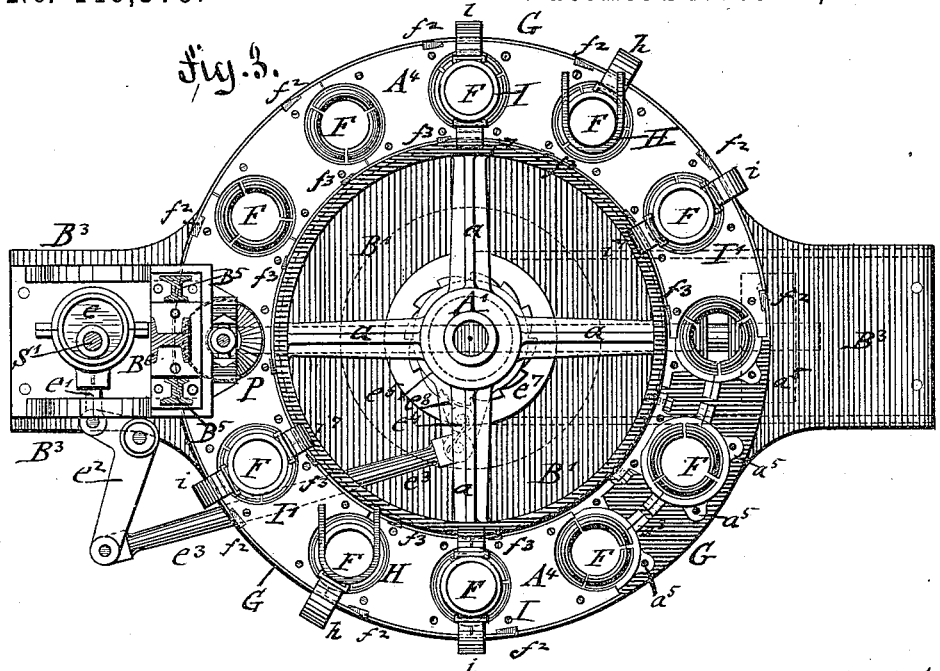
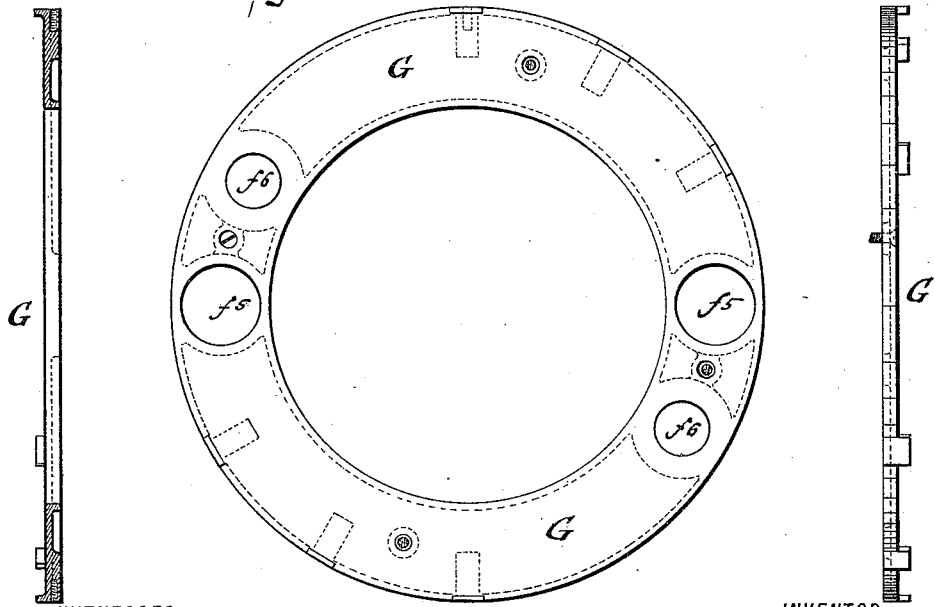
WITNESSES:
INVENTOR
Richard Steegmüller
BY
ATTORNEYS.

(No Model.) 6 Sheets—Sheet 4.
R. STEEGMÜLLER.
CAN HEADING MACHINE.
No. 440,379. Patented Nov. 11, 1890.
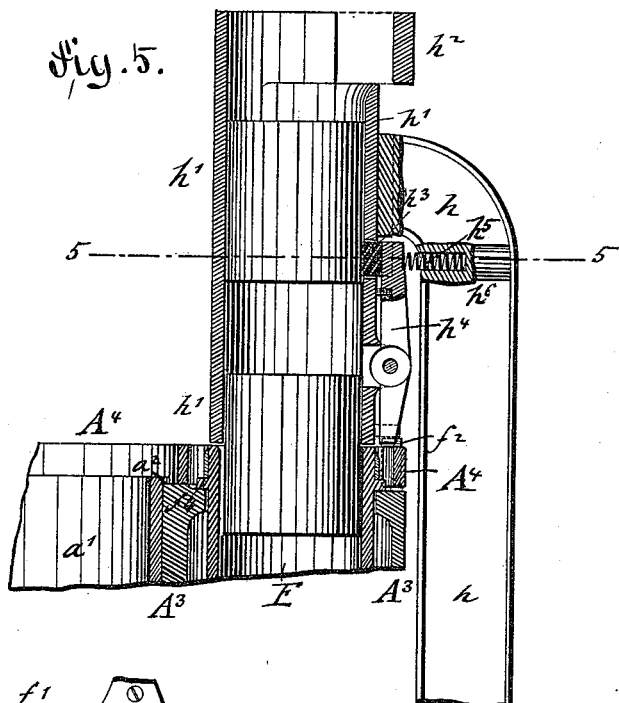
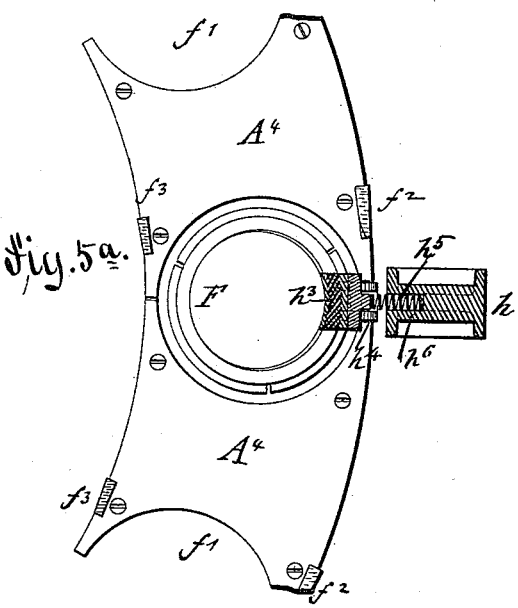
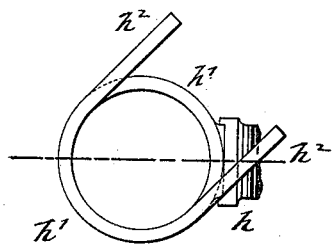
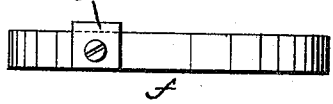
WITNESSES:
INVENTOR
Richard Steegmüller
BY
Gospel & Paegner
ATTORNEYS.

(No Model.) 6 Sheets—Sheet 5.

R. STEEGMÜLLER.
CAN HEADING MACHINE.

No. 440,379. Patented Nov. 11, 1890.

WITNESSES:

INVENTOR
Richard Steegmüller
BY
Goepel & Raegener
ATTORNEYS.

(No Model.)  6 Sheets—Sheet 6.

R. STEEGMÜLLER.
CAN HEADING MACHINE.

No. 440,379. Patented Nov. 11, 1890.

WITNESSES:

INVENTOR
Richard Steegmüller
BY
ATTORNEYS.

UNITED STATES PATENT OFFICE.

RICHARD STEEGMÜLLER, OF NEW YORK, N. Y.

CAN-HEADING MACHINE.

SPECIFICATION forming part of Letters Patent No. 440,379, dated November 11, 1890.

Application filed March 3, 1890. Serial No. 342,515. (No model.)

*To all whom it may concern:*

Be it known that I, RICHARD STEEGMÜLLER, of the city, county, and State of New York, a citizen of the Empire of Germany, have invented certain new and useful Improvements in Machines for Heading Sheet-Metal Cans, of which the following is a specification.

This invention has reference to an improved machine for heading sheet-metal cans and boxes by one continuous operation of the machine and in such a manner that by a double arrangement of the feeding and heading devices twelve cans or boxes are headed at each rotation of the mold-supporting frame, whereby the operation of heading said cans or boxes can be performed at a considerable saving in time and labor as compared to the former methods used for this purpose.

The invention consists of a machine for heading sheet-metal cans and boxes, which comprises a horizontal mold-supporting frame, mechanism for imparting a step-by-step rotary motion to the same, and a stationary ring-shaped shell below the mold-supporting frame, which shelf is provided with openings, respectively, for the can-heading plungers and for the dropping of the headed cans, so that they can be conducted off. The mold-supporting frame is arranged with a series of molds and with a double set of feeding devices for the bottoms, bodies, and tops of the cans, so as to assemble said parts in the molds and subject them to the action of vertically-reciprocating can-heading plungers.

The invention consists, further, in the construction of the mold-supporting frame, the mold-carriers, and the molds employed, and of the feeding devices for the can bottoms, bodies, and tops, so as to drop the parts necessary for making up a can in connection with fixed tapered projections or toes on the shelf of the mold-supporting frame.

Figure 2:
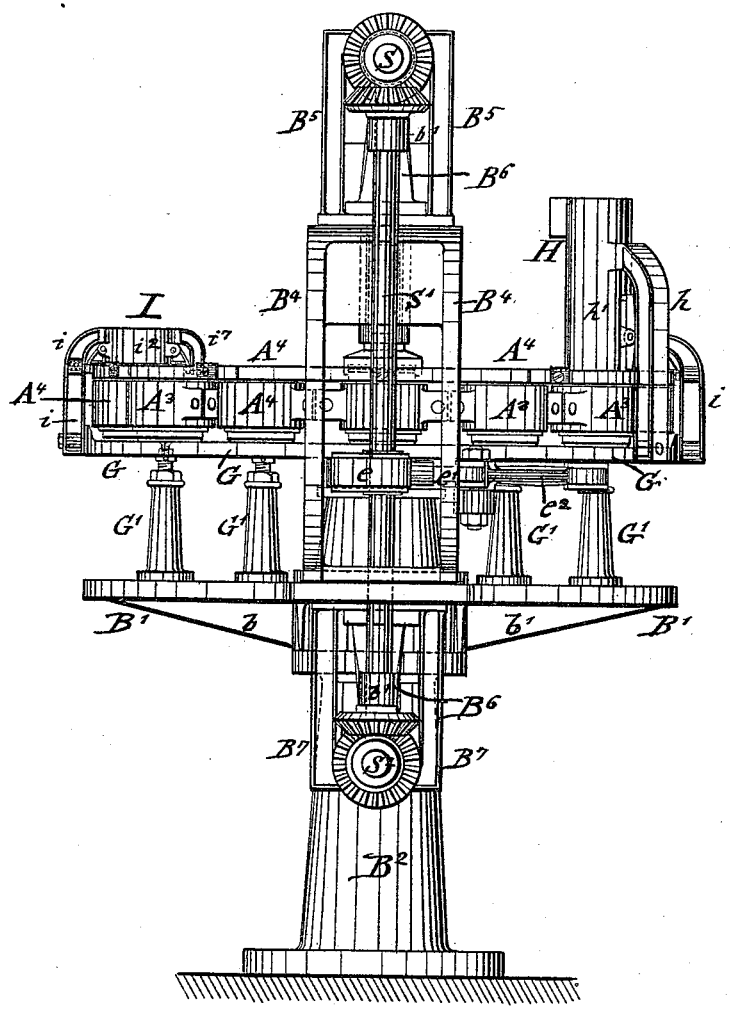
Figure 7:
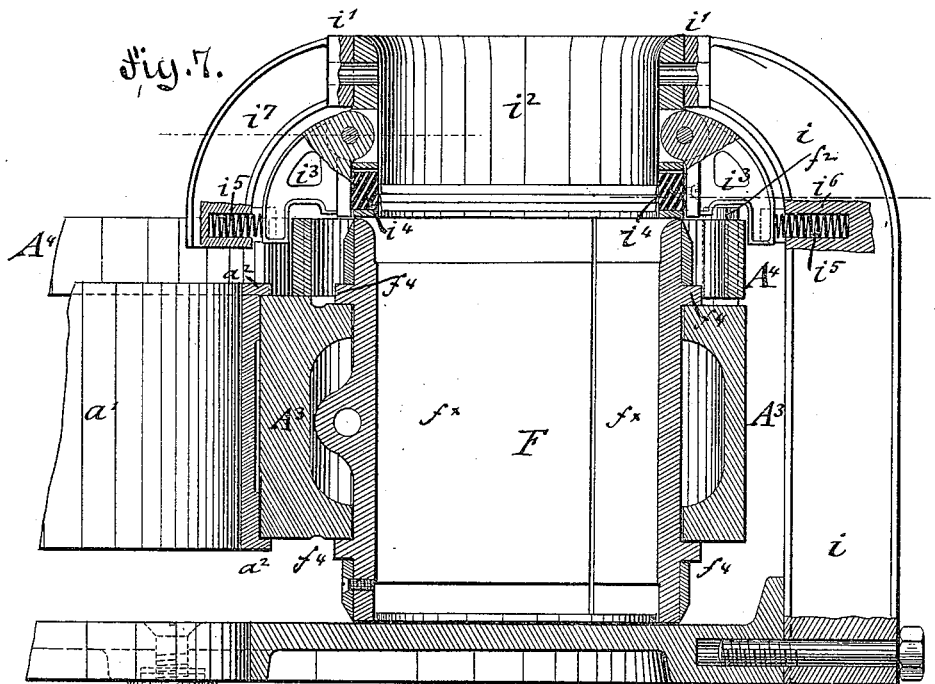
Figure 8:
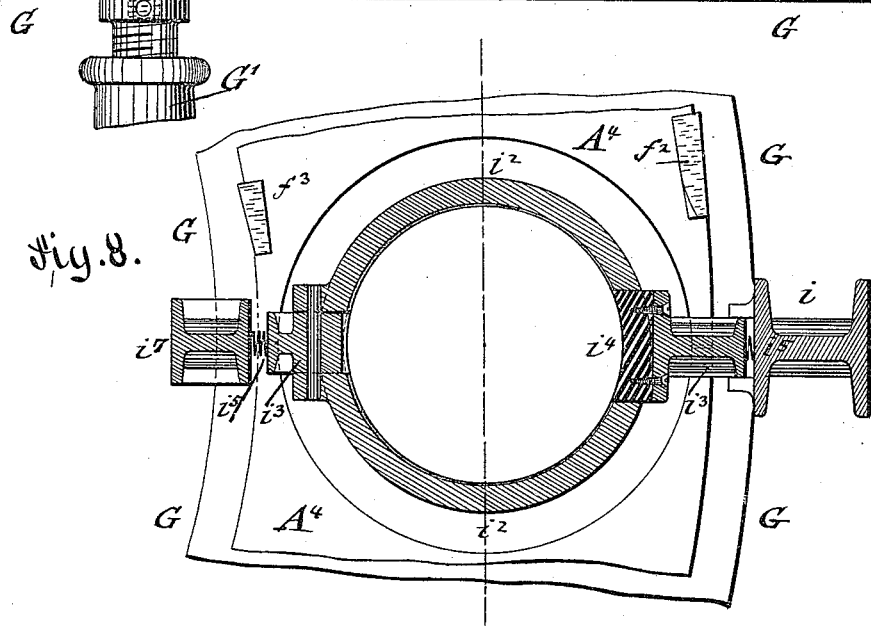
Figure 9:
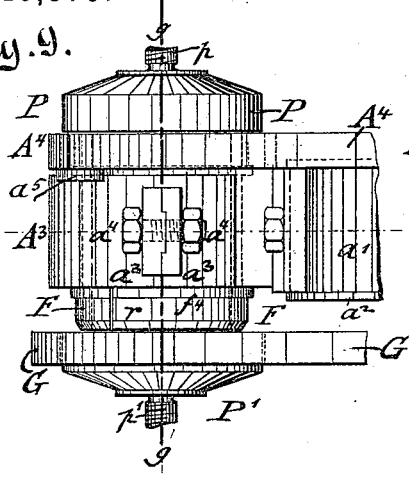
Figure 10:
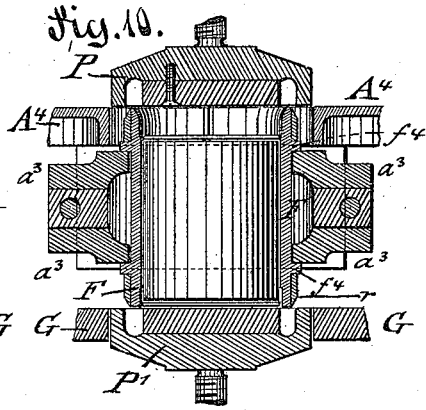
Figure 11:
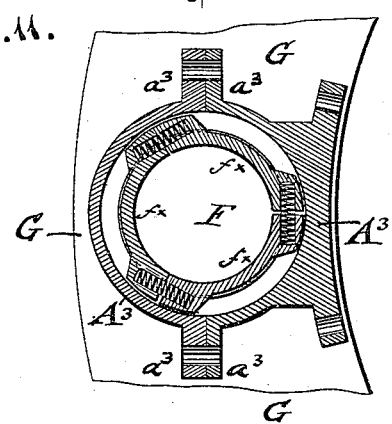
Figure 12:
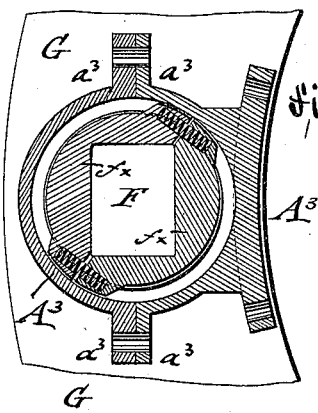
Figure 13:
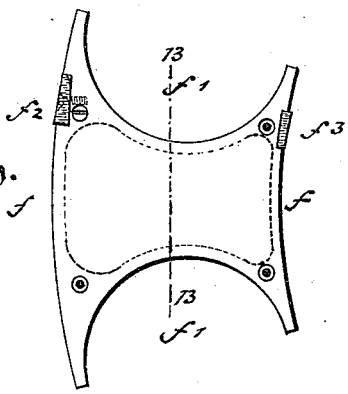
Figure 14:
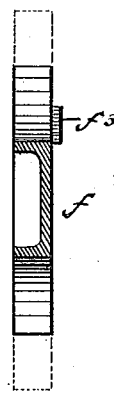

In the accompanying drawings, Figure 1 represents a front elevation, one-half being in section, of my improved machine for heading sheet-metal cans and boxes. Fig. 2 is a side elevation of the same. Fig. 3 is a plan, partly in horizontal section, on the line 1 1, Fig. 1. Fig. 4 is a detail top view of the stationary ring-shaped shelf below the mold-supporting frame, showing the openings in the same. Figs. 4ᵃ and 4ᵇ are respectively a central cross-section and an end view of said stationary ring. Figs. 5, 5ᵃ, and 5ᵇ are respectively a vertical central section of one of the devices for feeding the can-bodies to the molds, a horizontal section on line 5 5, Fig. 5, and a top view of the same. Fig. 6 is a side view of one of the sections of the mold-supporting frame. Figs. 7 and 8 are respectively a vertical central section and a horizontal section of one of the molds and the device for feeding the bottoms or tops of the cans to the same. Figs. 9 and 10 are respectively a detail side view and a vertical transverse section on line 9 9, Fig. 9, of one of the molds and the plungers for heading the cans. Figs. 11 and 12 are horizontal sections of one of the molds and mold-carriers, showing them, respectively, arranged for round cans and oblong boxes; and Figs. 13 and 14 are respectively a detail top view and a vertical transverse section of the same on line 13 13, Fig. 13, of one of the sections of the top shelf of the mold-supporting frame.

Similar letters of reference indicate corresponding parts.

My improved machine for heading sheet-metal cans and boxes is made of circular shape and so constructed that a double set of feeding and heading devices is arranged for the purpose of producing twelve cans for each full rotation of the machine.

The operating parts of the machine are so arranged in relation to a rotary horizontal mold-supporting frame that the different parts required for making a can—to wit, the bottom, body, and top—can be dropped by gravity from suitable feeding devices to the molds in the horizontal mold-supporting frame. The mold-supporting frame A has a hub A' and radial arms *a*, said hub being supported on suitable bearings at the upper end of a central tubular pillar B, which is supported on a horizontal circular table B'. The table B' is strengthened by ribs *b* at the under side and again supported on a tubular pillar B², which is made of slightly conical shape and provided with a large base for attachment to a suitable bed-plate or foundation. At diametrically-opposite points of the table B' are arranged rectangular extensions B³ on a level with the table B', said extensions serving for supporting upright standards B⁴, the inner ends of which serve as guides for the vertical shanks of the can-heading plungers, which will be fully described hereinafter. To the upper ends of the standards $B^4$ are attached vertical yokes $B^5$, which are provided with bearings $b$ for the driving-shaft S of the machine. The shaft S extends diametrically from one side of the machine to the other, as shown clearly in Fig. 1. One of the standards $B^4$ carries, in addition to the upper standard $B^5$, an outwardly-curved standard $B^6$, which, in connection with a similar standard $B^6$, attached to the under side of the extension of the table $B'$, serves to support, in connection with a neck and step bearing $b'$ $b'$ at the outer ends of the standards $B^6$, a vertical intermediate shaft $S'$, which rests by a fixed collar $b^2$ on the step-bearings of the lower standard $B^6$. Rotary motion is transmitted from the driving-shaft S by bevel-wheels to the intermediate shaft $S'$ and by similar bevel-wheels from the lower end of the latter to an auxiliary shaft $S^2$, which is supported in bearings $b^3$ of hangers $B^7$, attached to the under side of the table $B'$. The auxiliary shaft $S^2$ is located vertically below and parallel with the driving-shaft S, both shafts being provided with grooved cam-disks $d^2$ $d^2$, that engage anti-friction rollers $d'$ on the ends of the vertically-guided adjustable shanks $p$ of the can-heading plungers P P', so as to impart thereby the required vertically-reciprocating motion to said plungers.

To the vertical intermediate shaft $S'$ is applied a fixed eccentric $e$, which is connected by a strap-rod $e'$ with an elbow-lever $e^2$, that is fulcrumed to a fixed ring-shaped shelf below the mold-supporting frame, and connected by a pivot-rod $e^3$ with an arm $e^4$ of a loose strap $e^5$, that extends around the lower part of the hub $A'$ of the mold-supporting frame A, said strap $e^5$ being supported on the hub between a shoulder $e^6$ and a ratchet-wheel $e^7$, which latter is keyed to the hub $A'$ and engaged by a spring-pawl $e^8$ on the oscillating arm $e^6$, so that by the eccentric $e$ and the intermediate mechanism described an intermittent step-by-step rotary motion is imparted to the mold-supporting frame A.

*The mold-supporting frame.*—The mold-supporting frame A is composed of an interior spider-frame, which is formed of the hub $A'$, the arms $a$ $a$, and a circumferential tire $a'$, a number of cylindrical mold-carriers $A^3$, and a ring-shaped shelf $A^4$, having openings $f'$ for said carriers. The tire $a'$ is provided with exterior circumferential shoulders or flanges $a^2$ at the upper and lower edges for supporting between said flanges the enlarged bases of the carriers $A^3$. These bases of the carriers $A^3$ are bolted to the ring-shaped tire of the spider-frame $a$ $a$, said carriers being arranged equidistantly from each other. Each mold-carrier $A^3$ is made of two sections—an inner and an outer section—which are provided at their ends with perforated lugs $a^3$, having interlocking tongues and grooves, as shown in Figs. 9 and 11, said lugs being firmly connected by suitable screw-bolts $a^4$. The outer sections of the mold-carrier $A^3$ are provided at their upper ends with outwardly-projecting horizontal ears $a^5$, which serve, in connection with the base of the inner section, for the purpose of attaching the sections $f$ of the ring-shaped top shelf $A^4$. The sections $f$ are made of cast-iron and provided with circumferential re-enforcing ribs at the under side, through which the fastening-bolts are passed, by which the connection with the inner and outer sections of the carriers $A^3$ is made. The sections $f$ have semicircular recesses in their adjoining sides, which form circular openings $f'$ for the mold-carriers. Each section $f$ of the shelf $A^4$ is provided, respectively, at its outer and inner circumference with fixed tapering projections or toes $f^2$ $f^3$, which serve to engage suitable levers of the feeding devices, so as to produce the dropping of the can-forming parts from said feeding devices as the shelf $A^4$ is rotated with the mold-carriers below the same. In each mold-carrier $A^3$ is supported a sectional mold F, which is adapted either for receiving round cans or oblong boxes, as shown in Figs. 11 and 12. For round cans the mold F is formed of three segmental sections $f^\times$, which are provided at their ends with sockets, into which spiral springs are placed that serve to spread the mold-sections as far as permitted by the mold-carriers. When sheet-metal boxes are to be made, the mold F is formed of two sections $f^\times$, as shown in Fig. 12, which are likewise provided with sockets at their ends and cushioned by spiral springs, by which the mold-sections are moved apart until they come in contact with the mold-carriers. The mold-sections $f^\times$ rest by exterior shoulders $f^4$ on the upper and lower edges of the carriers $A^3$, so as to be retained on the same against vertical strains while expanding radially by the action of the cushioning-springs. The inner surface of the upper and lower ends of the mold-sections is slightly offset, as shown in Fig. 1, so as to furnish the extra space required for the flanges of the top and bottom of the cans. The upper and lower ends of the mold-sections $f^\times$ are surrounded by beveled segments T, so as to permit the mold-sections to be pressed together by the can-heading plungers P P', before referred to. These plungers are formed of annularly-grooved plates, the size of which corresponds to the ends of the mold-sections, so that when said plungers pass over the ends of the mold-sections the latter are pressed together, so as to hug the can-body and hold it in position for heading the body by applying the bottom and top to the same. Below the molds F is arranged a stationary ring-shaped shelf G, which is supported on upright pillars $G'$, that are attached to the supporting-table $B'$, and provided at their upper ends with adjusting-screws, by means of which the shelf G can be raised or lowered, so as to be adjusted accurately in relation to the lower ends of the molds, as shown in Figs. 2, 3, $4^a$, and $4^b$.

The lower ends of the molds and the can-bottoms on the same are guided over the stationary shelf G by the rotating motion of the mold-supporting frame A until the can-bottoms arrive vertically above the bottom plunger P'. At this point the shelf is provided with an opening $f^5$ of sufficient size for the passage of the lower plunger P', so that the can-bottoms can be pressed by the action of the same over the lower end of the can-bodies. A second opening $f^6$ in the stationary shelf F, next following the opening $f^5$, serves for permitting the headed cans to drop below the shelf G for being conducted off for further treatment.

*The feeding devices.*—Above the top shelf $A^4$ are arranged the feeding devices, by which, respectively, the bottoms, bodies, and tops of the cans are successively fed to the molds of the mold-supporting frame. The can-bottom-feeding devices I are arranged at diametrically-opposite points of the machine, and are shown clearly in Figs. 3, 7, and 8. They are made of the same construction as the top-feeding devices I'; the former being charged with a number of flanged bottoms superposed one above the other, while in the latter are placed the flanged tops. The bottom and top feeding devices I and I' are each supported on a vertical standard $i$, which is attached to the lower stationary shelf G, said standard being curved inwardly at the upper end, and provided with a ring-shaped collar $i'$, that serves to support a supply-cylinder $i^2$, into which the can bottoms or tops are placed, the inner upper edge of the cylinder being rounded off so as to facilitate the inserting of said can bottoms or tops. The supply-cylinder $i^2$ has recesses at diametrically-opposite points, into which are pivoted oscillating lever-arms $i^3$, that are provided with rubber blocks $i^4$, having concave faces, said levers being acted upon by spiral or other springs $i^5$, that are inserted in sockets $i^6$ of the supporting-standard $i$ and of a curved arm $i^7$, that extends from the inner side of the collar $i'$ downwardly below the inner circumference of the shelf $A^4$, as shown clearly in Fig. 7. When the tapered projection or toes $f^2 f^3$ on the rotary shelf $A^4$, which toes project not only above but also slightly outside of the circumference of the shell, as shown in Fig. 8, approach the lower ends of pivoted lever-arms $i^3$, they engage said ends and move the same against the pressure of the spiral springs in outward direction, so as to cause the receding of the concaved rubber blocks for a short period of time and the dropping of the lowermost can bottom or top onto the shelf $A^4$, over which it slides until the next opening $f'$ arrives below the cylinder $i^2$ and permits the lowermost bottom or top to drop through the opening of the shelf onto the stationary shelf G. As soon as the toes $f^2 f^3$ pass beyond the lever-arms $i^3$, the rubber blocks $i^4$ are forced inwardly by the action of the springs $i^5$, so as to hold the superimposed can-bottoms firmly in position until the lever-arms are actuated again by the next following toes. In this manner only one can bottom or top is delivered at the time, while the remaining ones are firmly held in position in the supply-cylinder $i^2$. Between the can bottom and top feeding devices is arranged on a fixed standard $h$, attached to the stationary shelf G, the can-body-feeding device H, which is clearly shown in Figs. 5, $5^a$, and $5^b$. The can-body-feeding device is formed of a vertical supply-cylinder $h'$, which is provided at its upper end with a side opening and parallel guide-wings $h^2$, to which the can-body is fed by an endless conveyer (not shown in the drawings) and tilted from a horizontal into a vertical position, so as to move downward in the cylinder $h'$, as shown clearly in Fig. 5. The can-body is supported in the feed-cylinder $h'$ by means of a rubber cheek $h^3$, having a concave face, which cheek projects through a recess of the cylinder into the interior of the same, said cheek being attached to the upper end of a fulcrumed lever $h^4$, the lower end of which is acted upon by the inner faces of the projections or toes $f^2$, as shown in Figs. 5 and $5^a$. The upper end of the lever $h^4$ is also acted upon by a spiral spring $h^5$ in a socket $h^6$, so that the rubber cheek is forced in again as soon as the toe $f^2$ has released the lower end of the fulcrumed lever $h^4$. As soon as the can-body is released by the rubber cheek $h^3$, it is dropped from the feed-cylinder into the mold, so as to rest on the can-bottom which has been dropped into the mold immediately before the body is dropped. The mold passes then to the next feed device, by which a can-top is dropped on the body and from the same to the plungers, by which the heading of the body or the attaching of the bottom and top to the body is produced.

*Operation of the machine.*—For operating the machine it is necessary to fill the supply-cylinders of the feeding devices, respectively, with can-bottoms, bodies, and tops. It is also necessary to place the necessary number of can-bodies on the horizontal conveyer, by which they are transmitted to the vertical supply-cylinder of the can-body-feeding device. This conveyer for can-bodies is well known and forms no part of my invention. Its motion is so timed that whenever a can-body is dropped from the supply-cylinder into the mold below the same another can-body is supplied by the conveyer to the upper part of the supply-cylinder and retained by the rubber cheek in the same. In the machine shown in the drawings the rotary shelf $A^4$ of the mold-supporting frame A is provided with twelve openings and with twelve molds below said openings. One half of said openings and molds serve for assembling and heading one can or box and the other half for simultaneously assembling and heading a second can or box. At diametrically-opposite points of the machine are arranged the feeding devices for the can-bottoms, can-bodies, and can-tops and the heading-plungers. As the rotary shelf and the molds are passing below the feeding devices they receive, first, the can-bottom, next the can-body, and then the top. When these parts are supplied to the molds, the parts forming the can are acted upon by the heading-plungers as soon as the mold arrives vertically in line with the same. The next motion of the mold-supporting frame brings the headed can over the opening $f^6$ in the stationary shelf G, through which the same is dropped and conducted off. The molds are then moved below the second set of feeding and heading devices, where the operations of feeding the bottoms, bodies, and tops are repeated and the parts then subjected to the actions of the plungers, so that the body is headed and the can dropped again, as before described. The sixth opening and mold in each half of the machine is arranged for the purpose of utilizing the machine for an additional operation when creased boxes are to be made, while for ordinary cans and boxes only five openings and molds are necessary for doing the work. The attachment required for this operation forms no part of this invention, and will be described in a later application.

The advantages of my improved can-heading machine are, first, that by the double arrangement of the operating parts a double quantity of cans or boxes can be headed at each rotation of the mold-supporting frame; secondly, that by the arrangement of a horizontally-rotating mold-supporting frame and vertical molds in the same the feeding of the parts of the cans is accomplished by gravity from the supply-cylinders of the feeding devices, while the conveying off of the headed can is also accomplished by gravity, and, thirdly, by constructing the machine as a double machine the feeding and heading devices are arranged at diametrically-opposite points of the intermittently-rotating mold-supporting frame, so as to balance each other, whereby a steady motion of the mold-supporting frame is obtained, so that the different operations can be performed in an accurate and reliable manner.

Having thus described my invention, I claim as new and desire to secure by Letters Patent—

1. The combination of a rotary mold-supporting frame, a stationary shelf below said mold-supporting frame, feed devices for supplying, respectively, the can bottoms, bodies, and tops to the molds of the mold-supporting frame, and heading devices for uniting said parts so as to form a can, substantially as set forth.

2. The combination, with an intermittently-rotating mold-supporting frame composed of a horizontal shelf having openings, mold-carriers supported below said openings, and molds within said carriers, of a stationary shelf below the mold-carriers, feeding devices for the can bottoms, bodies, and tops, and heading devices for uniting said parts, substantially as set forth.

3. The combination of an intermittently-rotating mold-supporting frame composed of a top shelf having a series of openings equidistantly from each other, mold-carriers below said openings and molds within said carriers, a stationary bottom shelf below the mold-carriers, feed devices arranged above the top shelf for supplying, respectively, the can bottoms, bodies, and tops, and vertically-reciprocating plungers arranged above and below the mold-supporting frame for heading the cans, the stationary shelf being arranged with an opening in line with said plungers, substantially as set forth.

4. The combination, with an intermittently-rotating mold-supporting frame formed of a top shelf having openings equidistantly from each other, fixed mold-carriers below said shelf, and molds in said carriers, of feed devices for the can bottoms, bodies, and tops, arranged above the top shelf, said feed devices having pivoted and spring-actuated levers with elastic face-blocks, which levers are engaged by tapering projections of the top shelf, so as to permit the successive droppings of the can bottoms, bodies, or tops from the feed devices into the molds, substantially as set forth.

5. A mold-supporting frame composed of a spider-frame, mold-carriers attached to the spider-frame, molds in said carriers, and a ring-shaped top shelf attached to the mold-carriers above the molds and having openings for the same, substantially as set forth.

6. A mold-supporting frame composed of a spider-frame having a circumferential tire with flanges at its upper and lower edges, mold-carriers attached to the flanged tire, molds having exterior shoulders resting on said carriers, and a top shelf attached to the mold-carriers and having openings surrounding the molds, substantially as set forth.

7. A mold-supporting frame composed of a spider-frame, mold-carriers attached to said spider-frame, molds supported in said carriers and formed of segmental and spring-actuated sections, and a top shelf attached to the mold-carriers and having openings surrounding the molds, substantially as set forth.

8. A mold composed of segmental sections having sockets in their adjacent ends and cushioning-springs in said sockets, substantially as set forth.

9. A mold composed of segmental sections having sockets in their adjacent ends and cushioning-springs in said sockets, said sections having tapering ends and interior shoulders or offsets for providing the required extra space for the flanges of the can tops and bottoms, substantially as set forth.

10. The top shelf $A^4$ of the mold-supporting frame formed of segmental sections $f\,f$, abutting at the ends, each section having semicircular end recesses $f''$ on said abutting ends, substantially as set forth.

11. The combination, with a mold-supporting frame formed of a top shelf having openings, mold-carriers below the same, and molds within said carriers, of tapering projections attached to the inner and outer circumferences of the top shelf, can bottom and top feeding devices formed of stationary supply-cylinders above the top shelf, and pivoted and spring-actuated levers that are engaged by said projections and provided with elastic face-blocks that project through openings in the interior of the same so as to successively drop the can bottoms and tops, substantially as set forth.

12. The combination, with a mold-supporting frame composed of a top shelf having openings, mold-carriers below said openings, and molds within said carriers, of a can-body-feeding device formed of a stationary supply-cylinder above the top shelf, a fulcrumed and spring-actuated lever engaged by tapering projections of the top shelf, and an elastic face-block at the upper end of the lever, said block projecting through an opening of the supply-cylinder to the interior of the same, substantially as set forth.

13. The combination of an intermittently-rotating mold-supporting frame formed of a top shelf having openings, mold-carriers below said shelf, and molds within said carriers, with vertically-reciprocating can-heading flanges arranged, respectively, above and below the molds, substantially as set forth.

14. The combination of an intermittently-rotating mold-supporting frame composed of a top shelf having openings, mold-carriers below said shelf, and molds within said carriers, said molds having tapering ends, with vertically-reciprocating plungers arranged, respectively, above and below the molds, and having annularly-grooved faces for engaging the ends of the molds, substantially as set forth.

15. The combination, with an intermittently-rotating mold-supporting frame, mold-carriers supported by said frame, a ring-shaped top shelf attached to said frame, a stationary ring-shaped shelf below said frame, pillars for supporting said shelf, and means for adjusting said shelf on said pillars relatively to the lower end of the mold-carriers, substantially as set forth.

16. The combination, with an intermittently-rotating mold-supporting frame, mold-carriers supported by said frame, a ring-shaped top shelf attached to said frame, and a stationary ring-shaped shelf supported below said frame, said shelf being provided with two openings, respectively, for the lower can-heading plunger and for the dropping of the headed cans, substantially as set forth.

In testimony that I claim the foregoing as my invention I have signed my name in presence of two subscribing witnesses.

RICHARD STEEGMÜLLER.

Witnesses:
PAUL GOEPEL,
MARTIN PETRY.